(12) United States Patent
Liu et al.

(10) Patent No.: US 11,836,931 B2
(45) Date of Patent: Dec. 5, 2023

(54) TARGET DETECTION METHOD, APPARATUS AND DEVICE FOR CONTINUOUS IMAGES, AND STORAGE MEDIUM

(71) Applicant: ZHENGZHOU YUNHAI INFORMATION TECHNOLOGY CO., LTD., Henan (CN)

(72) Inventors: Xuchen Liu, Henan (CN); Xing Fang, Henan (CN); Hongbin Yang, Henan (CN); Yun Cheng, Henan (CN); Gang Dong, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 505 days.

(21) Appl. No.: 17/273,320

(22) PCT Filed: Aug. 30, 2019

(86) PCT No.: PCT/CN2019/103703
§ 371 (c)(1),
(2) Date: Mar. 4, 2021

(87) PCT Pub. No.: WO2020/048396
PCT Pub. Date: Mar. 12, 2020

(65) Prior Publication Data
US 2021/0319565 A1    Oct. 14, 2021

(30) Foreign Application Priority Data
Sep. 6, 2018 (CN) .......................... 201811038286.7

(51) Int. Cl.
*G06T 7/215* (2017.01)
*G06T 7/223* (2017.01)
*G06N 3/04* (2023.01)

(52) U.S. Cl.
CPC ............... *G06T 7/215* (2017.01); *G06N 3/04* (2013.01); *G06T 7/223* (2017.01);
(Continued)

(58) Field of Classification Search
CPC ..................... G06T 7/215; G06T 7/223; G06T 2207/10016; G06T 2207/20084;
(Continued)

(56) References Cited

U.S. PATENT DOCUMENTS

2007/0025592 A1    2/2007    Takeshima et al.
2008/0232698 A1    9/2008    Shi et al.
(Continued)

FOREIGN PATENT DOCUMENTS

CN    101184235 A    5/2008
CN    101266689 A    9/2008
(Continued)

OTHER PUBLICATIONS

International Search Report for PCT/CN2019/103703 dated Nov. 28, 2019, ISA/CN.
(Continued)

*Primary Examiner* — Congvan Tran
(74) *Attorney, Agent, or Firm* — Yue (Robert) Xu; Apex Attorneys at Law, LLP (57) ABSTRACT

A method, an apparatus, and a device for target detection in consecutive images, and a computer-readable storage medium. A second frame is divided into multiple sub-images, before a target in the second frame in a video sequence is detected through a target-detecting network model. A first frame is searched, according to a preset rule for motion estimation, for a corresponding image block matched with each sub-image. Pixels of a sub-image, of which the matched image block is found in the first frame, are replaced with preset background pixels. Hence, a target
(Continued)

repeating in both frames is replaced. Finally, the second frame subject to the replacement is inputted in to the target-detecting network model, to obtain a bounding box of a target object of the second frame and a category of such target object. An algorithm for target detection in consecutive images is optimized.

10 Claims, 4 Drawing Sheets

(52) U.S. Cl.
CPC ............... *G06T 2207/10016* (2013.01); *G06T 2207/20021* (2013.01); *G06T 2207/20081* (2013.01); *G06T 2207/20084* (2013.01); *G06T 2207/20172* (2013.01)

(58) Field of Classification Search
CPC . G06T 2207/20172; G06T 2207/20021; G06T 2207/20081; G06N 3/04; G06N 3/045
See application file for complete search history.

(56) References Cited

U.S. PATENT DOCUMENTS

| 2014/0192163 | A1* | 7/2014 | Shimizu | G06T 7/194 |
| | | | | 348/46 |
| 2015/0054913 | A1* | 2/2015 | Annau | G06Q 30/0246 |
| | | | | 348/36 |
| 2016/0140689 | A1* | 5/2016 | Lux | H04N 19/136 |
| | | | | 345/428 |
| 2017/0024898 | A1 | 1/2017 | Spector et al. | |
| 2018/0173966 | A1 | 6/2018 | Shi et al. | |
| 2019/0073565 | A1* | 3/2019 | Saliou | G06F 18/21375 |
| 2019/0188524 | A1* | 6/2019 | He | G06F 18/28 |

FOREIGN PATENT DOCUMENTS

| CN | 101271514 A | 9/2008 |
| CN | 101901486 A | 12/2010 |
| CN | 102567727 A | 7/2012 |
| CN | 103986910 A | 8/2014 |
| CN | 108280843 A | 7/2018 |
| CN | 108416250 A | 8/2018 |
| CN | 109272509 A | 1/2019 |

OTHER PUBLICATIONS

First Office Action dated Jun. 4, 2021 for Chinese patent application No. 201811038286.7, English translation provided by Global Dossier.

Liu Zhen-hua et al., "Improved Background Motion Compensation Technique in Aerial Image Sequence", Computer Engineering, vol. 35 No.2, Jan. 31, 2009, pp. 222-224.

Jia Tao et al., "Moving object detection based on blob analysis", 2008 IEEE International Conference on Automation and Logistics, Sep. 30, 2008, pp. 322-325.

* cited by examiner

TARGET DETECTION METHOD, APPARATUS AND DEVICE FOR CONTINUOUS IMAGES, AND STORAGE MEDIUM

The present application is the national phase of International Application No. PCT/CN2019/103703, titled "TARGET DETECTION METHOD, APPARATUS AND DEVICE FOR CONSECUTIVE IMAGES, AND STORAGE MEDIUM" filed on Aug. 30, 2019, which claims the priority to Chinese Patent Application No. 201811038286.7, titled "METHOD, APPARATUS, AND DEVICE FOR DETECTING TARGET IN CONSECUTIVE IMAGES, AND STORAGE MEDIUM", filed on Sep. 6, 2018 with the China National Intellectual Property Administration, which is incorporated herein by reference in its entirety.

FIELD

The present disclosure relates to the technical field of image processing, and in particular to a method, an apparatus, and a device for target detection in consecutive images, and a computer-readable storage medium.

BACKGROUND

As one of the most basic and primary tasks in computer vision, target detection is widely applied in various aspects of industry and daily life with an upsurge of artificial intelligence in recent years. Examples of the aspects are autonomous driving, security systems, games, and entertainment.

The Faster-RCNN algorithm is widely used in detecting a feature of a behavior of a moving target and tracking the moving target. In such algorithm, feature regions of an image are extracted first via a convolutional layer and a pooling layer of a convolutional neural network (CNN). The feature regions are shared for a subsequent region proposal network (RPN) and a subsequent fully-connected layer. Then, a candidate frame is generated by the RPN. It is first determined whether an anchor belongs to a foreground or a background through a softmax layer and the fully-connected layer, and then the anchor is modified through bounding box regression to obtain an accurate candidate frame. Finally, a Region-of-Interest (RoI) pooling layer collects the inputted feature region, and sends such data to the fully-connected layer to determine a category of a target.

The Faster-RCNN algorithm is capable to track and detect the behavior of the moving target by using complicated architecture, which results in a high requirement on a terminal. Thus, it is difficult to implement this algorithm in an application scenario of videos or an application scenario requiring fast object detection. The YOLO-v3 algorithm is faster in image processing, and can be implemented under various operating systems due to easy implantation. The YOLO-v3 algorithm requires less on hardware, and therefore can be easily implemented on lightweight devices.

In the YOLO-v3 algorithm, a feature is first extracted from an input image through a feature extracting network, to obtain a feature map of a certain size, such as 13*13. Then, the input image is divided into 13*13 grid cells (units of a grid). A grid cell is applied to predict an object (which is a target), in a case that a center of the object falls in such gird cell in ground truth (which is annotated data). Each grid cell would predict bounding boxes of a fixed quantity (in the YOLO-v3 algorithm, there are three bounding boxes of different initial sizes), and only the bounding box having the largest intersection over union (IoU) with the ground truth is used for predicting the object. Two dimensions of the feature map outputted through prediction are consistent the dimensions of an extracted feature, such as 13*13, and another dimension (which is depth) of the output feature map is equal to B*(5+C). B represents the quantity of bounding boxes that are predicted by each grid cell, for example, two for YOLO-v1, five for YOLO-v2, three for YOLO-v3. C represents a quantity of categories of the bounding box. The number "5" represents information of four coordinates and a confidence coefficient.

The YOLO-v3 algorithm with adjusted parameters and an optimized model is capable to identify and track objects in a video quickly, achieving rapid detection with certain accuracy. The YOLO-v3 algorithm uses a single frame as a basic input for identification, and runs on each frame a complete algorithm for target-detection. That is, each frame is decompressed and sent into a deep learning network for target detection, and finally bounding boxes of a different quantity are obtained for each frame. Hence, much redundant information is introduced when ensuring average accuracy of target detection in videos. For example, an object in an I-frame (a key frame in video compression) has been detected through the CNN algorithm. When the object appears at a similar position in a P-frame (a forward-differential frame in video compression) or a B-frame (a bi-direction-differential frame in video compression), the CNN algorithm has to calculate a bounding box for the object again. Such redundant calculation increases complexity of the CNN algorithm for target detection, and increases the amount of calculation. As a result, there is a large amount of calculation and low throughput in the whole process of target detection, and a performance of target detection for video sequences is reduced.

SUMMARY

An objective of the present disclosure is to provide a method, an apparatus, a device for target detection in consecutive images, and a computer-readable storage medium. An amount of calculation is greatly reduced in a whole process of target detection, and thereby throughput of target detection is improved for moving objects in consecutive images (such as a video sequence).

Following technical solutions are provided according to embodiments of the present disclosure to address the above technical issues.

A method for target detection in consecutive images is provided, including:

inputting a first frame in a video sequence into a target-detecting network model, to obtain a bounding box of a target object of the first frame and a category of the target object of the first frame;

dividing a second frame in the video sequence into multiple sub-images, and searching, according to a preset rule for motion estimation, the first frame for an image block matching with each sub-image, to determine a position, of the target object in the first frame, in the second frame;

replacing pixels of a sub-image in the multiple sub-images with preset background pixels, where the image block matched with the sub-image is found in the first frame; and inputting the second frame, in which the pixels of the sub-image are replaced, into the target-detecting network model, to obtain a bounding box of a target object of the second frame and a category of the target object of the second frame;

where the second frame is subsequent and adjacent to the first frame.

In an optional embodiment, the target-detecting network model is a YOLO-v3 network model or a SSD network model.

In an optional embodiment, after inputting the second frame, in which the pixels of the sub-image are replaced, into the target-detecting network model, the method further includes:
dividing a third frame in the video sequence into multiple sub-images, and searching, according to the preset rule for motion estimation, the first frame and the second frame for image blocks matching with each sub-image, to determine a position, of the target object in frames previous to the third frame, in the third frame;
replacing pixels of a sub-image in the multiple sub-images with preset background pixels, where the image blocks matched with the sub-image are found in the first frame and the second frame; and
inputting the third frame, in which the pixels of the sub-image are replaced, into the target-detecting network model, to obtain a bounding box of a target object of the third frame and a category of the target object of the third frame;
where the third frame is subsequent and adjacent to the second frame.

In an optional embodiment, before dividing the second frame in the video sequence into the multiple sub-images, the method further includes:
denoising the second frame in the video sequence that is acquired, to remove noise interference in the second frame.

An apparatus for target detection in consecutive images is provided, including:
a first-frame inputting module, configured to input a first frame in a video sequence into a target-detecting network model, to obtain a bounding box of a target object of the first frame and a category of the target object of the first frame;
an image matching module, configured to divide a second frame in the video sequence into multiple sub-images, and search, according to a preset rule for motion estimation, the first frame for an image block matching with each sub-image, to determine a position, of the target object in the first frame, in the second frame, where the second frame is subsequent and adjacent to the first frame;
a background replacing module, configured to replace pixels of a sub-image in the multiple sub-images with preset background pixels, where the image block matched with the sub-image is found in the first frame; and
a second-frame inputting module, configured to input the second frame, in which the pixels of the sub-image are replaced, into the target-detecting network model, to obtain a bounding box of a target object of the second frame and a category of the target object of the second frame.

In an optional embodiment, the target-detecting network model is a YOLO-v3 network model or a SSD network model.

In an optional embodiment, the apparatus further includes a third-frame processing module, where the module includes:
a previous-frame matching sub-module, configured to divide a third frame in the video sequence into multiple sub-images, and search, according to the preset rule for motion estimation, the first frame and the second frame for image blocks matching with each sub-image, to determine a position, of the target object is in frames previous to the third frame, in the third frame, where the third frame is subsequent and adjacent to the second frame;

a repeated-target replacing sub-module, configured to replace pixels of a sub-image in the multiple sub-images with preset background pixels, where the image blocks matched with the sub-image are found in the first frame and the second frame; and
a third-frame inputting sub-module, configured to input the third frame, in which the pixels of the sub-image are replaced, into the target-detecting network model, to obtain a bounding box of a target object of the third frame and a category of the target object of the third frame.

In an optional embodiment, the apparatus further includes:
a denoising module, configured to denoise the second frame and the third frame in the video sequence, to remove noise interference in the second frame and the third frame.

A device for target detection in consecutive images is provided, including a processor, configured to implement steps of any foregoing method for target detection in consecutive images when executing a computer program stored in a memory.

A computer-readable storage medium is provided, storing a program for target detection in consecutive images, where the program when executed by a processor implements steps of the forgoing method for target detection in consecutive images.

The method for target detection in consecutive images is provided according to embodiments of the present disclosure. The second frame may be divided into the multiple sub-images, before the target in the second frame in the video sequence is detected through the target-detecting network model. The first frame is searched, according to the preset rule for motion estimation, for the corresponding image block matched with each sub-image. Pixels of the sub-image, of which the matched image block is found in the first frame, are replaced with the preset background pixels. Hence, a target repeating in both frames is replaced. Finally, the second frame subject to the replacement is inputted in to the target-detecting network model, to obtain the bounding box of the target object in the second frame and the category of such target object. The algorithm for target detection in consecutive images is optimized.

The technical solutions according to embodiments of the present disclosure are advantageous in following aspects. Redundant information, i.e. the repeated target object, in the consecutive images such as adjacent frames in the video sequence is analyzed, and accordingly such target object in the latter frame is replaced by data of the background pixels. An amount of processed data is greatly reduced for target detection in the latter frame. Addressed is a problem in conventional technology that not considering information of a target detected and recognized in a temporally adjacent frame reduces a performance of target detection. Information of the identified target in the adjacent frame is applied to reduce the computational complexity of target detection in the current frame. Complexity of the target-detecting network model is reduced, and throughput of target detection is improved.

In addition, an apparatus, a device, and a computer-readable storage medium are further provided according to embodiments of the present disclosure, for implementing the method for target detection in consecutive images. Hence, the forgoing method is more practical. The apparatus, the device, and the computer-readable storage medium achieves corresponding advantages.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

In order to help those skilled in the art better understand solutions of the present disclosure, hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

The terms "first", "second", "third", "fourth", etc. in description, claims, and drawings of the present disclosure are intended to distinguish different objects, instead of describing a specific sequence. In addition, the terms "including" and "comprising" and any variations thereof are intended to cover non-exclusive inclusions. For example, a process, a method, a system, a product, or a device that includes a series of steps or units is not limited to the listed steps or units, but may include unlisted steps or units.

Technical solutions of the present disclosure are introduced as above. Hereinafter various non-limiting embodiments of the present disclosure are described in detail.

Figure 1:
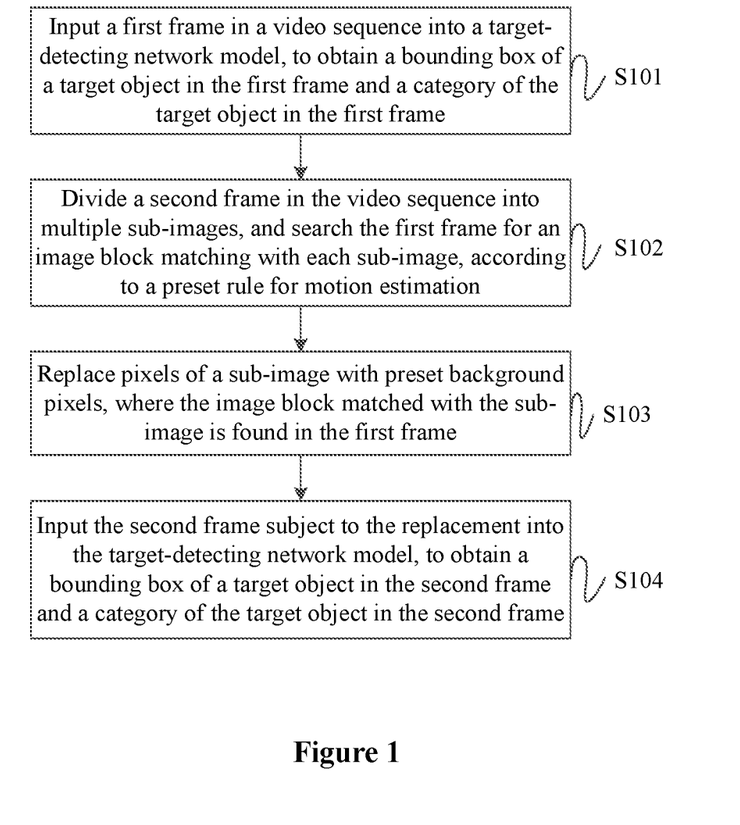
FIG. 1 is a flow chart of a method for target detection in consecutive images according to an embodiment of the present disclosure.

Reference is made to FIG. 1, which is a flow chart of a method for target detection in consecutive images according to an embodiment of the present disclosure. The embodiment of the method may include steps S101 to S104.

In step S101, a first frame in a video sequence is inputted into a target-detecting network model, to obtain a bounding box of a target object of the first frame and a category of the target object of the first frame.

The video sequence includes a series of consecutive images. That is, multiple frames of adjacent images are arranged in a chronological order.

The target-detecting network model may be any network model obtained from a set of sample data trained by a target-detecting algorithm. In an optional embodiment, the target-detecting network model may be a YOLO-v3 network model or a SSD (Single Shot Multibox Detector) network model.

The target-detecting network model recognizes a target object in an input image automatically, marks each target object with a bounding box in the image, and outputs a category of each target object. The category is, for example, human, animal, or plant.

The first frame is a frame that is inputted first when performing target detection on the video sequence.

In step S102, a second frame in the video sequence is divided into multiple sub-images, and the first frame is searched for an image block matching with each sub-image, according to a preset rule for motion estimation, so as to determine a position, of the target object in the first frame, in the second frame.

The second frame is subsequent to the first frame and adjacent to the first frame.

The rule for motion estimation determines a target object in the entire video sequence, after the target object in the video sequence is tracked and analyzed through any target-tracking algorithm in conventional technology. A manner of obtaining the rule for motion estimation based on a target-tracking algorithm may refer to conventional technology, which is not described in detail herein.

In a case that an image block matched with any sub-image of the second frame is found in the first frame, it indicates that there is a repeated target object in the two frames. That is, the target object appears both in the first frame and the second frame. In a same process of target detection, the target object has been recognized in the last step, and therefore detecting such target object in the second frame is undoubtedly a redundant action that achieves no practical effect. In view of the above, the repeated target object that has appeared in the first frame may be removed, so as to reduce an amount of data processed for the second frame in the target detection.

In step S103, pixels of a sub-image are replaced with preset background pixels, where the image block matched with the sub-image is found in the first frame.

The background pixels may replace the pixels at a position in the latter frame, where the position corresponds to the target object repeating in the adjacent frames. Thereby, such target object is not processed in this step of target detection.

In step S104, the second frame subject to the replacement is inputted into the target-detecting network model, to obtain a bounding box of a target object of the second frame and a category of the target object of the second frame.

Searching (the first image for a corresponding matched image block) and determining (whether there is an image block in the first image which matches with a current sub-image) are performed sequentially on each sub-image of the second frame. Then, all sub-images, of which a matched image block is found, are replaced with background pixels. After the replacement, the target object to be detected in the second frame is different from the target object detected in the first frame.

Technical solutions are provided according to embodiments of the present disclosure. Redundant information, i.e. the repeated target object, in the consecutive images such as adjacent frames in the video sequence is analyzed, and accordingly such target object in the latter frame is replaced by data of the background pixels. An amount of processed data is greatly reduced for target detection in the latter frame. Addressed is a problem in conventional technology that not considering information of a target detected and recognized in a temporally adjacent frame reduces a performance of target detection. Information of the identified target in the adjacent frame is applied to reduce the computational complexity of target detection in the current frame. Complexity of the target-detecting network model is reduced, and throughput of target detection is improved.

Figure 2:
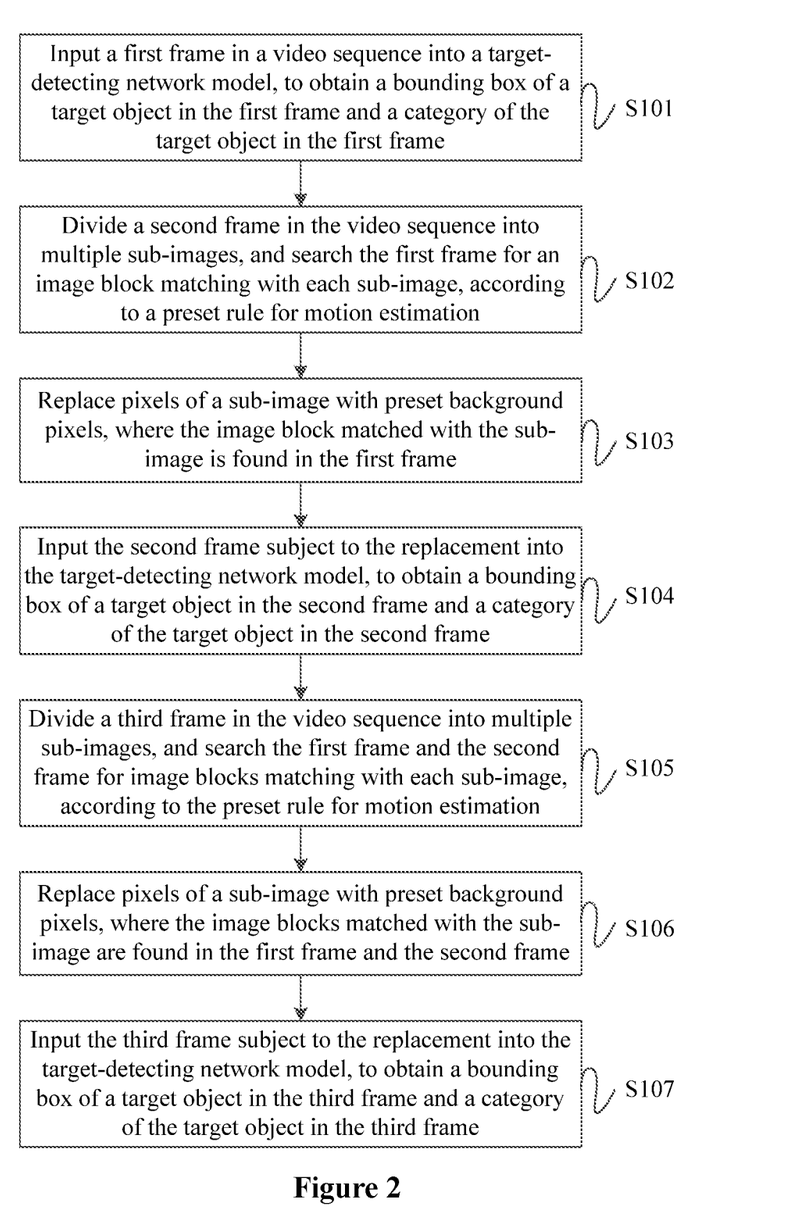
FIG. 2 is a flow chart of another method for target detection in consecutive images according to an embodiment of the present disclosure.

Reference is made to FIG. 2. On a basis of the foregoing embodiment, the method may further include steps S105 to S107.

In step S105, a third frame in the video sequence is divided into multiple sub-images, and the first frame and the second frame are searched for image blocks matching with each sub-image, according to the preset rule for motion estimation, so as to determine a position, of the target object in frames previous to the third frame, in the third frame.

In step S106, pixels of a sub-image are replaced with preset background pixels, where the image blocks matched with the sub-image are found in the first frame and the second frame.

In step S107, the third frame subject to the replacement is inputted into the target-detecting network model, to obtain a bounding box of a target object of the third frame and a category of the target object of the third frame.

The first frame and the second frame are searched for the block matched with each sub-image in the third frame, according to a certain rule for motion estimation. Thereby, a position, of the target object in the previous frames, in the third frame is obtained. In the third frame, the sub-image containing the repeated target object is replaced with the background pixels.

In a similar manner, each subsequent frame is processed according to the above steps, so as to obtain a bounding box and a category of all target objects in the video sequence.

Therefore, the algorithm for target detection in consecutive images is optimized according to embodiments of the present disclosure. Based on redundancy among consecutive images, information of the identified target in the adjacent frame is applied to reduce the computational complexity of target detection in the current frame, and throughput of target detection is improved.

The acquired video sequence may be denoised, in order to further improve accuracy of image recognition. That is, before being inputted into the target-detecting network model, each frame is denoised to remove noise interference in such frame. Thereby, accuracy and efficiency of target detection is further improved.

An apparatus for implementing the method for target detection in consecutive images is further provided according to embodiments of the present disclosure, and hence the foregoing method is more practical. Hereinafter illustrated is an apparatus for target detection in consecutive images according to an embodiment of the present disclosure. Description of the following apparatus may refer to that of the forgoing method, and vice versa.

Figure 3:
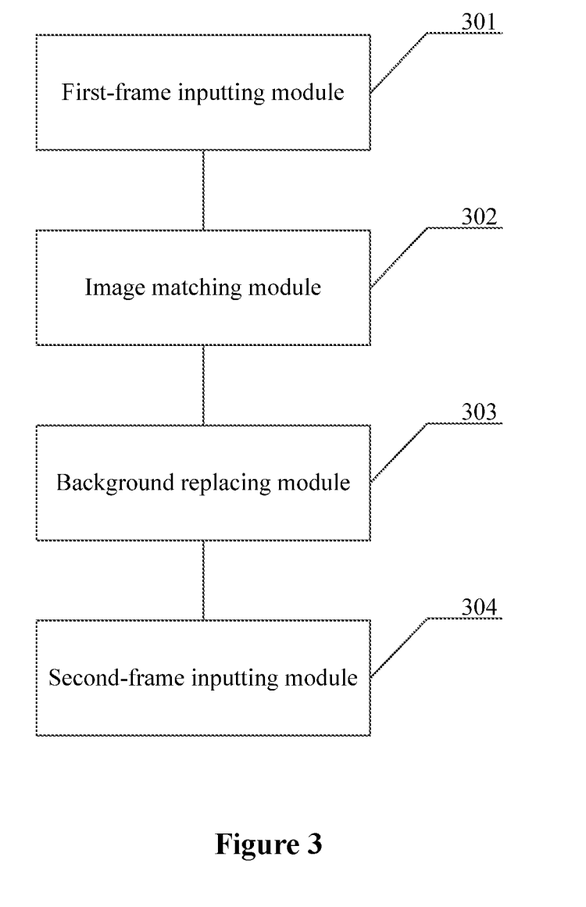
FIG. 3 is a structural schematic diagram of a target detecting apparatus according to an embodiment of the present disclosure.

Reference is made to FIG. 3, which is a structural schematic diagram of an apparatus for target detection in consecutive images according to an embodiment of the present disclosure. The apparatus may include a first-frame inputting module 301, an image matching module 302, a background replacing module 303, and a second-frame inputting module 304.

The first-frame inputting module 301 is configured to input a first frame in a video sequence into a target-detecting network model, to obtain a bounding box of a target object of the first frame and a category of the target object of the first frame.

The image matching module 302 is configured to divide a second frame in the video sequence into multiple sub-images. The image matching module 302 is further configured to search the first frame for an image block matching with each sub-image, according to a preset rule for motion estimation, so as to determine a position, of the target object in the first frame, in the second frame. The second frame is subsequent and adjacent to the first frame.

The background replacing module 303 is configured to replace pixels of a sub-image in the multiple sub-images with preset background pixels, where the image block matched with the sub-image is found in the first frame.

The second-frame inputting module 304 is configured to input the second frame, in which the pixels of the sub-image are replaced, into the target-detecting network model, to obtain a bounding box of a target object of the second frame and a category of the target object of the second frame.

Figure 4:
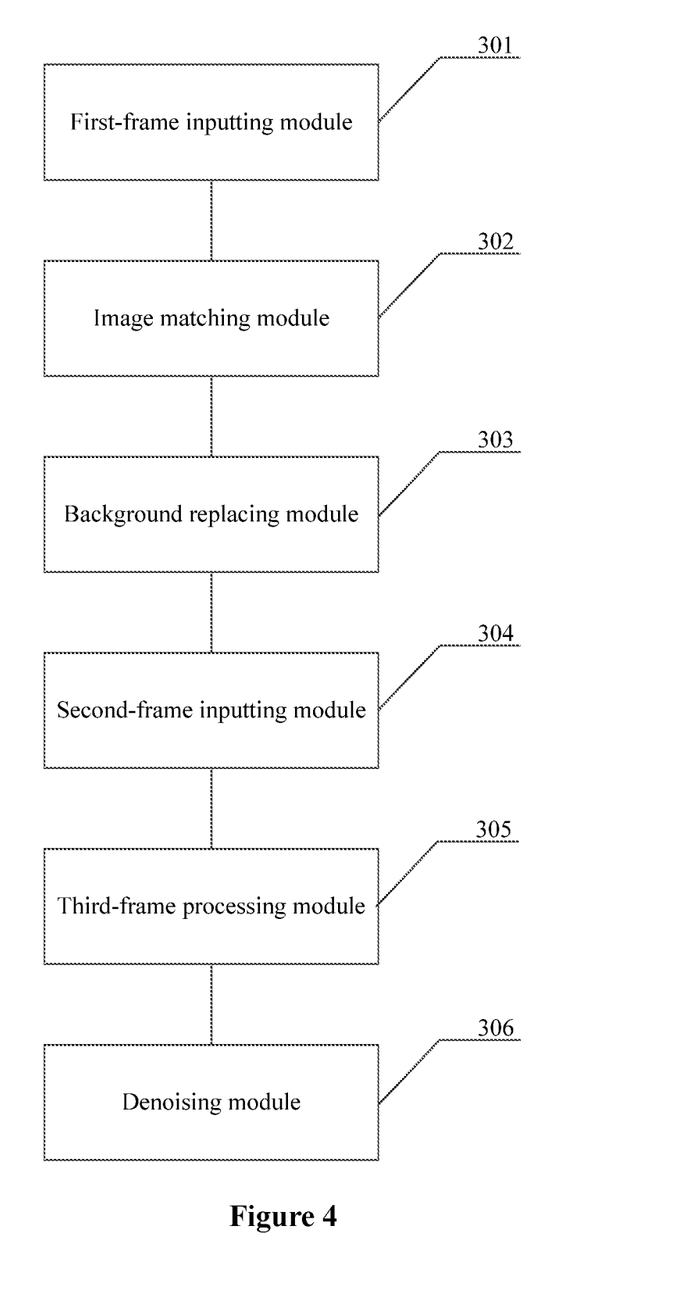
FIG. 4 is a structural schematic diagram of another target detecting apparatus according to an embodiment of the present disclosure.

Reference is made to FIG. 4. In an optional embodiment, the apparatus may further include a third frame processing module 305. The third frame processing module 305 includes a previous-frame matching sub-module, a repeated-target replacing sub-module, and a third-frame inputting sub-module.

The previous-frame matching sub-module is configured to divide a third frame in the video sequence into multiple sub-images. The previous-frame matching sub-module is further configured to search the first frame and the second frame for image blocks matching with each sub-image, according to the preset rule for motion estimation, so as to determine a position, of the target object is in frames previous to the third frame, in the third frame. The third frame is subsequent and adjacent to the second frame.

The repeated-target replacing sub-module is configured to replace pixels of a sub-image in the multiple sub-images with preset background pixels, where the image blocks matched with the sub-image are found in the first frame and the second frame.

The third-frame inputting sub-module is configured to input the third frame, in which the pixels of the sub-image are replaced, into the target-detecting network model, to obtain a bounding box of a target object of the third frame and a category of the target object of the third frame.

In another embodiment of the present disclosure, the apparatus may further include a denoising module 306. The denoising module 306 is configured to denoise the first frame, the second frame, and the third frame in the video sequence, so as to remove noise interference in the video sequence.

A function of each functional module of the apparatus for target detection in consecutive images according to embodiments of the present disclosure may be implemented according to the method mentioned in the foregoing method embodiments. A specific process of the implementation may refer to relevant description of the forgoing method embodiments, which is not repeated herein.

Therefore, the algorithm for target detection in consecutive images is optimized according to embodiments of the present disclosure. Based on redundancy among consecutive images, information of the identified target in the adjacent frame is applied to reduce the computational complexity of target detection in the current frame, and throughput of target detection is improved.

A device for target detection in consecutive images is further provided according to an embodiment of the present disclosure. The device may include a memory and a processor.

The memory is configured to store a computer program.

The processor is configured to execute the computer program to implement steps of any method for target detection in consecutive images according to the foregoing embodiments.

A function of each functional module of the device for target detection in consecutive images according to embodiments of the present disclosure may be implemented according to the method mentioned in the foregoing method embodiments. A specific process of the implementation may refer to relevant description of the forgoing method embodiments, which is not repeated herein.

Therefore, the algorithm for target detection in consecutive images is optimized according to embodiments of the present disclosure. Based on redundancy among consecutive images, information of the identified target in the adjacent frame is applied to reduce the computational complexity of target detection in the current frame, and throughput of target detection is improved.

A computer-readable storage medium is further provided according to an embodiment of the present disclosure. The storage medium stores a program for target detection in consecutive images. The program when executed by a processor implement steps of any method for target detection in consecutive images according to the foregoing embodiments.

A function of each functional module of the computer-readable storage medium according to embodiments of the present disclosure may be implemented according to the method mentioned in the foregoing method embodiments. A specific process of the implementation may refer to relevant description of the forgoing method embodiments, which is not repeated herein.

Therefore, the algorithm for target detection in consecutive images is optimized according to embodiments of the present disclosure. Based on redundancy among consecutive images, information of the identified target in the adjacent frame is applied to reduce the computational complexity of target detection in the current frame, and throughput of target detection is improved.

The embodiments of the present disclosure are described in a progressive manner, and each embodiment places emphasis on the difference from other embodiments. Therefore, one embodiment can refer to other embodiments for the same or similar parts. For the apparatuses disclosed in the embodiments, since they correspond to the methods disclosed in the embodiments, the description is relatively simple, and the relevant parts can be referred to the description of the methods.

As further be appreciated by those skilled in the art, the units and algorithmic steps in the examples described according to the embodiments disclosed herein can be implemented in forms of electronic hardware, computer software or the combination of the both. To illustrate the interchangeability of the hardware and the software clearly, the components and the steps in the examples are described generally according to functions in the above description. Whether hardware or software is used to implement the functions depends on a specific application and design constraints for the technical solution. For each specific application, different methods may be used by those skilled in the art to implement the described function, and such implementation should not be considered to depart from the scope of the present disclosure.

The steps of the method or algorithm described according to the embodiments disclosed herein can be implemented in forms of hardware, a software module executed by a processor or the combination of the both. The software module may be stored in a Random Access Memory (RAM), a memory, a Read-Only Memory (ROM), an electrically programmable ROM, an electrically erasable programmable ROM, a register, a hardware disk, a movable magnetic disk, CD-ROM or any other forms of storage medium well known in the art.

Hereinabove a method, an apparatus, and a device for target detection in consecutive images, and a computer-readable storage medium are illustrated in detail according to embodiments of the present disclosure. Specific examples are used herein to illustrate the principle and implementation of the present disclosure. The description of the embodiments is only intended to help understand methods and core ideas of the present disclosure. Those of ordinary skill in the art may make several improvements and modifications to the present disclosure without departing from the principle of the present disclosure. These improvements and modifications also fall within the protection scope of the claims of the present disclosure.

The invention claimed is:

1. A method for target detection in consecutive images, comprising:
   inputting a first frame in a video sequence into a target-detecting network model, to obtain a bounding box of a target object of the first frame and a category of the target object of the first frame;
   dividing a second frame in the video sequence into a plurality of first sub-images;
   searching, according to a preset rule for motion estimation, the first frame for an image block matching with each of the plurality of first sub-images, to determine a position of the target object in the second frame;
   replacing pixels of a first sub-image in the plurality of first sub-images with preset background pixels, wherein the image block matched with the first sub-image is found in the first frame; and
   inputting the second frame, in which the pixels of the first sub-image are replaced, into the target-detecting network model, to obtain a bounding box of a target object of the second frame and a category of the target object of the second frame;
   wherein the second frame is subsequent and adjacent to the first frame.

2. The method according to claim 1, wherein the target-detecting network model is a YOLO-v3 network model or a SSD (Single Shot Multibox Detector) network model.

3. The method according to claim 2, wherein after inputting the second frame in which the pixels of the first sub-image are replaced into the target-detecting network model, the method further comprises:
   dividing a third frame in the video sequence into a plurality of second sub-images;
   searching, according to the preset rule for motion estimation, the first frame and the second frame for image blocks matching with each of the plurality of second sub-images, to determine a position of the target object in the third frame;
   replacing pixels of a second sub-image in the plurality of second sub-images with the preset background pixels, wherein the image blocks matched with the second sub-image are found in the first frame and the second frame; and
   inputting the third frame, in which the pixels of the second sub-image are replaced, into the target-detecting network model, to obtain a bounding box of a target object of the third frame and a category of the target object of the third frame;
   wherein the third frame is subsequent and adjacent to the second frame.

4. The method according to claim 1, wherein before dividing the second frame in the video sequence into the plurality of first sub-images, the method further comprises:
   denoising the second frame in the video sequence that is acquired, to remove noise interference in the second frame.

5. A device for target detection in consecutive images, comprising:
a memory, storing a computer program;
a processor, configured to implement the method according to claim 1, when executing the computer program.

6. A computer-readable storage medium, storing a program for target detection in consecutive images, wherein:
the program when executed by a processor implements the method according to claim 1.

7. An apparatus for target detection in consecutive images, comprising:
a first-frame inputting module, configured to input a first frame in a video sequence into a target-detecting network model, to obtain a bounding box of a target object of the first frame and a category of the target object of the first frame;
an image matching module, configured to:
divide a second frame in the video sequence into a plurality of first sub-images, and
search, according to a preset rule for motion estimation, the first frame for an image block matching with each of the plurality of first sub-images, to determine a position of the target object in the second frame, wherein the second frame is subsequent and adjacent to the first frame;
a background replacing module, configured to replace pixels of a first sub-image in the plurality of first sub-images with preset background pixels, wherein the image block matched with the first sub-image is found in the first frame; and
a second-frame inputting module, configured to input the second frame, in which the pixels of the first sub-image are replaced, into the target-detecting network model, to obtain a bounding box of a target object of the second frame and a category of the target object of the second frame.

8. The apparatus according to claim 7, wherein the target-detecting network model is a YOLO-v3 network model or a SSD (Single Shot Multibox Detector) network model.

9. The apparatus according to claim 7, further comprising a third-frame processing module, wherein the third-frame processing module comprises:
a previous-frame matching sub-module, configured to
divide a third frame in the video sequence into a plurality of second sub-images, and
search, according to the preset rule for motion estimation, the first frame and the second frame for image blocks matching with each of the plurality of second sub-images, to determine a position of the target object in the third frame,
wherein the third frame is subsequent and adjacent to the second frame;
a repeated-target replacing sub-module, configured to replace pixels of a second sub-image in the plurality of second sub-images with the preset background pixels, wherein the image blocks matched with the second sub-image are found in the first frame and the second frame; and
a third-frame inputting sub-module, configured to input the third frame, in which the pixels of the second sub-image are replaced, into the target-detecting network model, to obtain a bounding box of a target object of the third frame and a category of the target object of the third frame.

10. The apparatus according to claim 7, further comprising:
a denoising module, configured to denoise the second frame and the third frame in the video sequence, to remove noise interference in the second frame and the third frame.

* * * * *